United States Patent [19]

Moskowitz et al.

[11] 4,206,694
[45] Jun. 10, 1980

[54] INFUSER PRIMARILY INTENDED FOR USE IN MAKING COFFEE

[75] Inventors: Paul M. Moskowitz, Brooklyn; Yuliy Rushansky, Bronx, both of N.Y.

[73] Assignee: Salton, Inc., Bronx, N.Y.

[21] Appl. No.: 908,053

[22] Filed: May 22, 1978

[51] Int. Cl.² .............................................. A23F 1/00
[52] U.S. Cl. ......................................... 99/295; 99/306
[58] Field of Search ................... 99/289 R, 295, 298, 99/300, 304–306, 323

[56] References Cited

U.S. PATENT DOCUMENTS

| | | | |
|---|---|---|---|
| Re. 22,879 | 5/1947 | Peters et al. | 99/303 |
| 54,933 | 5/1866 | Meigs | 99/303 |
| 2,567,027 | 9/1951 | Peters et al. | 99/303 |
| 3,075,453 | 1/1963 | Wagner et al. | 99/285 |
| 3,975,996 | 8/1976 | Vitous | 99/295 |
| 4,074,621 | 2/1978 | Cailliot | 99/286 |

*Primary Examiner*—Leonard D. Christian
*Attorney, Agent, or Firm*—Edward D. O'Brian; K. H. Boswell

[57] ABSTRACT

An infuser which is primarily intended for use in making coffee can be constructed utilizing a container having a bottom inlet. A filter element is located within the interior of the container in such a manner that the position of the filter element relative to the bottom of the container can be adjusted. The outlet for the container comprises a tube slidably mounted in the bottom of the container and spring biased upwardly so that the upper end of the tube is in communication with an opening through the filter at all times that the filter is in place within the interior of the container. The container preferably includes a lid which seals off the interior of the container and which carries a threaded shaft and a nut type structure for linearly moving the shaft. The shaft is secured to the filter so that as the nut is rotated the position of the filter within the container can be varied.

10 Claims, 6 Drawing Figures

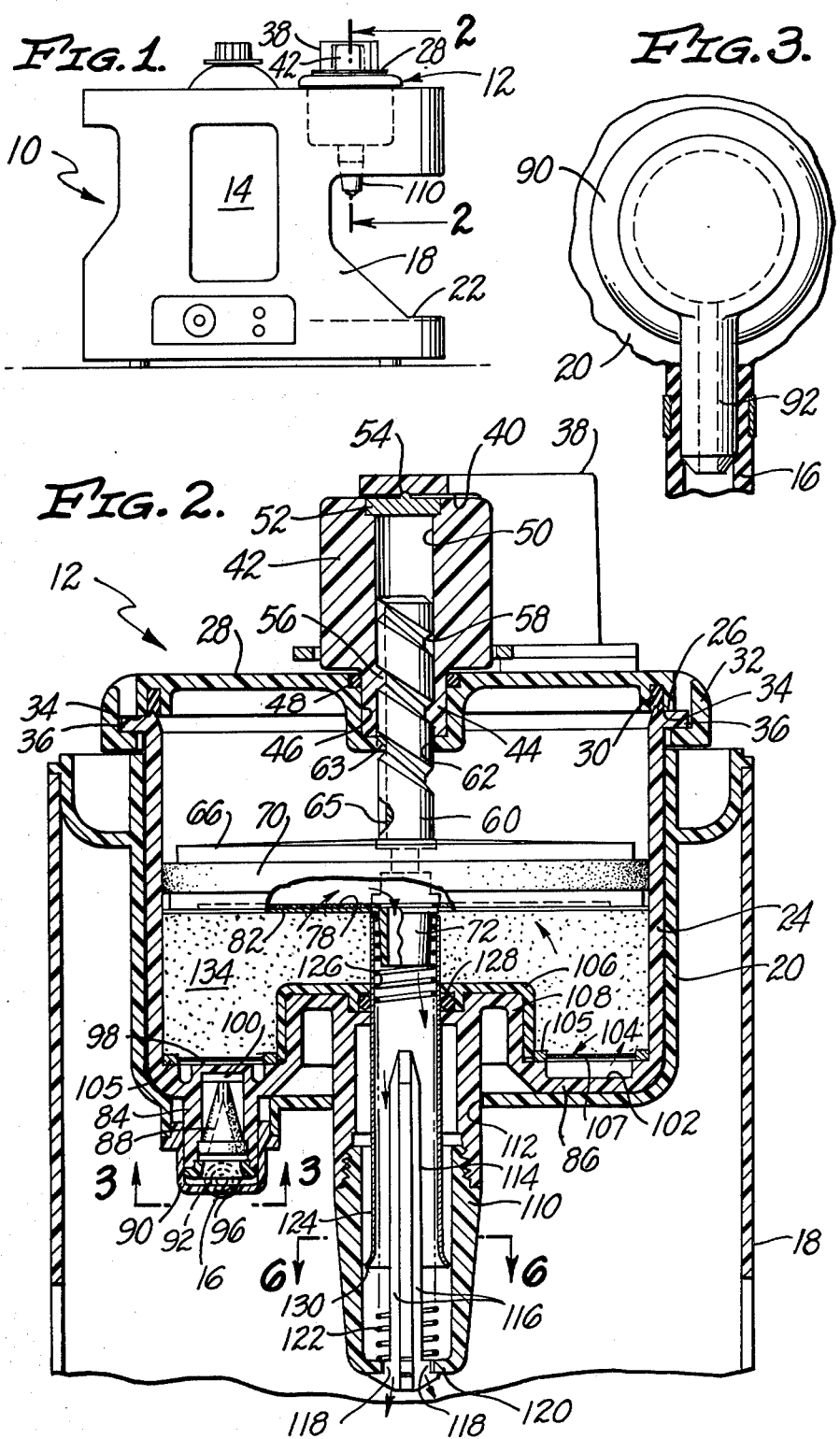

INFUSER PRIMARILY INTENDED FOR USE IN MAKING COFFEE

BACKGROUND OF THE INVENTION

The invention set forth in this specification pertains to new and improved infusers. More specifically it is directed to infusers which are primarily intended for use in making the beverage commonly referred to as coffee.

In an infuser an infusing liquid such as water is placed in contact with a material from which an infusion is to be prepared until such time as a solution is formed of one or more components of the material in the infusing liquid. Such a solution is referred to as an infusion. Such a resulting solution or infusion is normally separated from the material remaining after the infusion is formed in an infuser. Such infusers are most commonly employed in making beverages from various vegetable substances but on occasion they are also employed in extracting various compounds from quite a variety of different materials.

A number of different types of apparatus have been proposed and utilized as infusers in the preparation of the beverage coffee. Most commonly such infusers are constructed so that water flows downwardly in a container through a bed of ground and roasted coffee. However, a number of different infusers have been designed in which the water used in preparing the beverage coffee flows upwardly through a bed of the ground and roasted coffee. It is considered that an understanding of the reasons why such infusers employing upward flow are considered desirable in some applications is unnecessary to an understanding of the present invention.

Such prior infusers designed for the purpose of making the beverage coffee employing upward flow have normally been constructed so as to utilize a bottom inlet into a container having an outlet adjacent to the top of the container and so as to utilize a filter or filter type element located within the container adjacent to the outlet. Such filters or filter type elements have been used in such prior upward flow coffee makers to merely retain ground and roasted coffee beans so that they do not "flow" with the beverage produced into the outlet of the infuser employed.

As a consequence of this type of structure the ground and roasted coffee in such an apparatus is normally somewhat loose or free to move within the container employed. As a consequence of this there is danger of the liquid moving through the container tending to channelize to a degree so that not all particles of the ground and roasted coffee are equally contacted by the water. Further, frequently there is a tendency for such particles of ground and roasted coffee to be spaced from one another so that the bed of such particles does not create an adequate "back pressure" to the flow of liquid to slow up such flow in order to insure a desired degree of contact between the particles of the ground and roasted coffee and the water employed.

SUMMARY OF THE INVENTION

As a result of these considerations it is considered that there exists a need for new and improved infusers employing an upward flow of water in making the beverage coffee. A broad objective of the present invention is to fulfill this need. A further objective of the present invention is to provide coffee making infusers which can be adjusted so that regardless of the quantity of ground and roasted coffee being processed so as to make the beverage coffee at any one time, such ground and roasted coffee may be held under a desired degree of compaction in a fixed bed so as to tend to minimize any tendency of the water flowing through the bed tending to channelize and so as to control the back pressure against fluid flow exerted by the bed itself.

It is not to be assumed from the preceding that the infusers of the present invention are only utilizable in connection with the preparation of the beverage coffee. The problems encountered in connection with the preparation of the beverage coffee in an infuser serving as a coffee maker are considered to be present in connection with the preparation of a number of other different infusions from other materials than coffee. It is considered that the infusers of the present invention can be satisfactorily employed in making all sorts of infusions from different materials such as, for example, various different types of common and rather unconventional teas.

The various objectives of the present invention indicated in the preceding are achieved by providing an infuser including a container having a top, a bottom, an inlet leading to the bottom of the container, and an outlet leading from the interior of the container, the outlet being located above the inlet, the infuser also including a filter means positioned between the inlet and the outlet for maintaining material being infused within the interior of the container in which the improvement comprises: the filter means being movable within the interior of the container relative to the inlet so as to be capable of holding different quantities of material to be infused in a packed condition within the interior of the container adjacent to the bottom of the container and the outlet having an entrance, the position of which can be adjusted relative to the interior of the container so as to correspond in order to prevent liquid from accumulating in the container above the filter means.

A preferred infusion in accordance with this invention preferably includes a number of elements and features which are not indicated in the preceding discussion. Thus, for example, such an infuser preferably includes a positioning means for use in simultaneously adjusting the position of the filter means and of the entrance to the outlet so as to minimize the effort required to utilize the infuser. An infuser of the present invention also includes various known parts as have been previously employed in upward flow infusers in order to be satisfactory from a utilitarian standpoint.

DESCRIPTION OF THE DRAWING

Because of the nature of the invention it is considered that it is best explained with reference to the accompanying drawing in which:

FIG. 1 is a side elevational view of a coffee maker employing a presently preferred embodiment or form of an infuser in accordance with this invention;

FIG. 2 is a partial cross-sectional view at an enlarged scale taken at line 2—2 of FIG. 1 in which certain internal parts are shown in elevation;

FIG. 3 is a partial cross-sectional view at a further enlarged scale taken at line 3—3 of FIG. 2;

Figure 4:
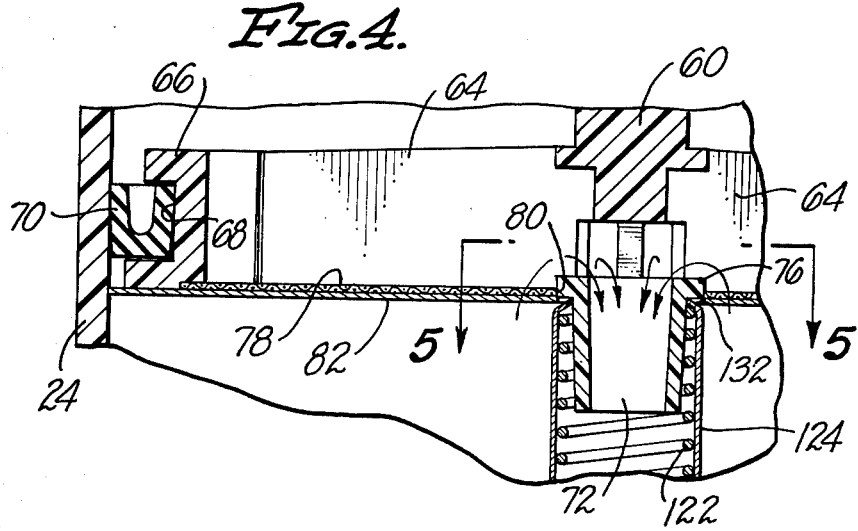
FIG. 4 is a partial cross-sectional view at an enlarged scale corresponding to FIG. 2 in which various parts as illustrated in elevation in FIG. 2 are shown in section.
Figure 5:
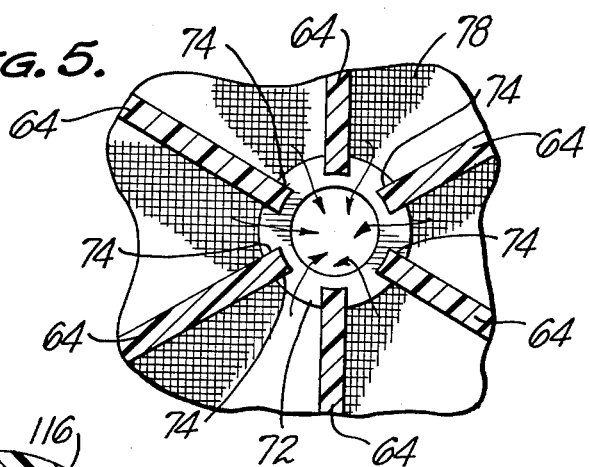
FIG. 5 is a partial cross-sectional view taken at line 5—5 of FIG. 4.
Figure 6:
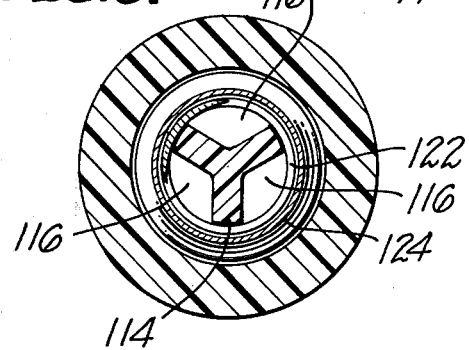
FIG. 6 is a partial cross-sectional view taken at line 5—6 of FIG. 2.

The infuser illustrated in the drawings is constructed so as to utilize the concepts or principles of the invention verbally expressed in the appended claims. These concepts or principles can be easily utilized in a variety of somewhat differently appearing and differently constructed infusers through the use or exercise of routine engineering skill. For this reason the invention is not to be considered as being limited to the precise structure illustrated.

DETAILED DESCRIPTION

In the drawing there is shown a complete coffee maker 10 which is constructed so as to include as a part of this coffee maker an infuser 12 in accordance with this invention. If desired the infuser 12 can, in and of itself, be referred to as a coffee maker. This coffee maker 10 includes various parts which are not necessary to an understanding of the present invention and which are not described herein. It does, however, include a unit or means 14 for heating water which is intended to supply hot water at an appropriate, common desired temperature through a tube 16 to the infuser 12.

Because the means 14 for heating water can be constructed in a number of different manners—including various known manners—it is not considered necessary to describe it in detail herein. The coffee maker 10 includes a housing 18 which is provided with a generally cup-shaped receptacle 20 for use in holding the infuser 12 generally above a platform 22 which may be utilized to hold a container (not shown) for receiving finished coffee produced by the infuser 12. If desired this platform 22 may be heated in a conventional manner.

The infuser 12 employs a generally cup-shaped container 24 having a top edge 26. A lid 28 fits against this top edge 26 for the obvious purpose of closing off the container 24 so as to prevent vapors from escaping from the container 24 as the infuser 12 is used. Preferably a conventional sealing ring 30 is carried by the lid 28 so as to fit against the top edge 26.

The lid 28 is provided with a peripheral flange 32 containing a series of equally spaced, elongated slots 34 which are adapted to receive a series of equally spaced projections 36 so that the lid 28 may be secured in place against movement upon the container 24. These slots 34 and the projections 36 are not described nor illustrated in detail because they are of a conventional, known type such as are commonly used for what may be referred to as a bayonet type connection. Obviously other equivalent mechanical means can be employed in mounting the lid 28 on the container 24.

The lid 28 utilized has an elongated bar-like handle 38 which may be used in manipulating the lid 28 into or out of position on the container 24. Within the handle 38 there is an internal cavity 40 which serves as a retainer for a more or less nut-like knob 42. This knob 42 is retained in place through the use of a cylindrical extension 44 on it fitting within a correspondingly shaped depression 46 in the center of the lid 28. A conventional seal 48 may be located around the extension 44 within the depression 46 so as to minimize the possibility of vapor leakage. Preferably a hollow interior 50 within the knob 42 is sealed off by a flat plate 52 having an upwardly extending projection 54 which fits within a corresponding cavity (not separately numbered) in the handle 38. The projection 54 helps stabilize the knob 42.

Within the interior 50 of the knob 42 there is located an internal thread-like projection 56 which fits within a corresponding thread-like groove 58 in an elongated shaft 60. This shaft 60 extends from the interior 50 of the knob 42 downwardly through a centrally located opening 62 in the depression 46 into the interior of the container 24. Rotation of the shaft 60 is prevented by a projection 63 in the opening 62 fitting within a slot 65 in the shaft 60. Within the interior of this container 24 the shaft 60 carries a series of radially extending arms 64 which connect the shaft 60 to a circular rim 66 of slightly smaller external diameter than the internal diameter of the container 24. This rim 66 is provided with a peripheral groove 68 carrying an extending sealing member 70 which makes contact with and seals against the interior of the container 24.

The shaft 60 also carries a centrally located hollow bushing 72 which extends downwardly from the shaft 60 beneath the various arms 64. A plurality of upper openings 74 are provided so as to lead into the interior of the bushing 72 from between the various different arms 64. A peripheral flange 76 is located on the bushing 72 immediately beneath these openings 74. This flange 76 and the rim 66 are secured to and support a disk-like filter element 78 having a centrally located opening 80 in such a manner that the arms 64 tend to reinforce this element 78 against upward bowing as the infuser 12 is used.

If desired the filter element 78 may be directly secured or attached to the arms 64. It will be realized that the precise nature of the filter element 78 is essentially a matter of choice. It is considered that it is preferable for this element to be a comparatively perforate screen formed out of a relatively inert material. When the element 78 is formed out of such a screen it is considered desirable to use it in connection with a replaceable filter paper disk 82 which fits closely up against the element 78 and the rim 66 and which fits closely around the bushing 72. The use of such a disk 82 is considered to be essentially a matter of individual option.

The inlet (not separately numbered) for the container 24 includes a hollow nipple 84 extending downwardly from the bottom 86 of this container 24. This nipple 84 preferably contains a known elastomeric duck-bill or Thomas type check valve 88 serving to prevent flow from the interior of the container 24 through the nipple 84 but permitting flow into the interior of the container 24. Water is conveyed to the container 24 through the use of a small more or less cup-shaped extension 90 on the receptacle 20. This extension 90 is provided with another nipple 92 connected by a tube 16 to the unit 14 for heating water.

Leakage between the interior of the extension 90 and the exterior of the nipple 94 may conveniently be prevented through the use of a sealing washer 96 or through the use of any equivalent structure. If desired the valve 88 can be constructed so as to not only serve as a valve but in addition so as to serve as the sealing washer 96.

The top of the nipple 84 is closed off by a plate 98 and side openings 100 are provided in the nipple 84 immediately adjacent to this plate 98. These openings 100 lead to an annular groove 102 leading around the bottom 86 which serves to distribute water so that such water may flow upwardly past another filter element 104 into the container 24 as the infuser 12 is used. This filter element 104 can, of course, be constructed in a number of different manners as indicated in the preceding discussion relative to the filter element 78. Preferably it includes solid rings 105 which are integral with a perforate screen 107.

Preferably this element 104 is formed as a separate unit which may be taken out of the container 24 for cleaning purposes. A cup 106 fits closely around and is secured to a centrally located cylindrical boss 108 which extends upwardly from the center of the bottom 86. This boss 108 is provided with a downwardly extending, centrally located discharge tubular housing 110 which extends through an opening 112 in the receptacle 20 to above the platform 22.

Within the housing 110 there is located an upwardly extending, probe-like guide 114 having a series of peripheral grooves 116 leading to discharge openings 118 located in the lowermost end 120 of the housing 110. This guide 114 is employed for the purpose of retaining an elongated coil spring 122 so that such a spring 122 extends upwardly from the end 120 through the interior of a hollow tube 124 serving as the outlet for the container 24. This tube 124 extends upwardly from the housing 110 into the interior of the container 24 through an opening 126 in the retaining cup 106. A seal is preferably formed around the exterior of the tube 124 through the use of a conventional sealing ring 128 which is held in place by the retaining cup 106.

If desired the lower end 130 of the tube 124 may be outwardly beveled as shown so as to limit the upward movement of the tube 124. Preferably the upper end 132 of the tube 124 serving as an entrance into the tube 124 is inwardly beveled so as to retain the spring 122 in such a manner that the spring 122 effectively exercises the upwardly biasing function in the preceding. It will be apparent from a consideration of FIG. 4 of the drawing that the bushing 72 is dimensioned so as to be capable of fitting closely within the end 132 and the spring 122 during the utilization of the infuser 12.

As the infuser 12 is to be utilized the lid 28 is of course removed from the container 24 and this container 24 is located within the receptacle 20 with the filter element 104 in place. At this point because of the action of the spring 122 the tube 124 will be biased well upwardly toward the top edge 26. Material 134 to be used in forming an infusion such as ground, roasted coffee beans will next be located within the container 24 upon the filter element 104. The quantity of such material 134 will normally vary depending upon the quantity of the infusion such as the beverage coffee to be made, and depending upon the desired concentration of the infusion.

Next, the lid 28 with, of course, the attached shaft 60 and various elements as indicated in the preceding as carried by this shaft will be located on the container 24 and locked in place through the use of the slots 34 and the projections 36. As this occurs the bushing 72 will be inserted within the tube 124. Depending upon the precise dimension of the various parts used and the relative position of the shaft 60, the tube 124 may be pushed downwardly to some limited extent as the lid 28 is located in place.

Next the knob 42 will be turned so as to move the shaft 60 downwardly until such time as the material 134 located within the container 24 is held against relative movement. The degree of compression applied to such material may be varied somewhat. In general, however, it is considered that such material 134 should be compressed adequately so that there will be no relative movement of such material 134 within the container 24 as the infuser 12 is used. This can normally be accomplished by merely turning the knob 42 through the use of the hand until a resistance to further turning can be felt. This will normally provide adequate room for expansion of the material 134 as an infusion is prepared.

As the shaft 60 is moved in this manner the bushing 72 will apply pressure to the tube 124 moving this tube 124 downwardly. This will create a comparatively tight fit between the end 132 and the flange 76 serving to prevent any significant leakage between these parts. Also the pressure exerted against the material 134 will serve to bias the projections 36 in the slots 34 so as to securely hold the lid 28 in place.

At this point the infuser 12 is ready to use. As water is supplied to it through the tube 94 this water will be distributed through the grooves 102 so that it will tend to rise in the manner indicated by the arrows in FIG. 2 in a substantially uniform manner around the interior of the container 24. Because the material 134 being infused is held in a "packed" state of compression this material 134 will not move significantly as the water rises in this manner and there will be substantially no channelization of flow within this material 134. The rate at which the water will move through the material 134 will depend upon the degree of compaction of this material 134.

The liquid which moves upwardly through the material will, of course, pass through the disk 82 and the filter element 80 and then will move or flow inwardly toward the opening 74 and then downwardly through the bushing 72 of the tube 124 and out through the opening 118. After a desired quantity of infusion is prepared in this manner water is no longer supplied through the tube 94 and the lid 28 is removed from the container 24. The entire infuser 12 may then be removed for cleaning purposes.

We claim:

1. An infuser including a container having a top, a bottom, an inlet leading to the bottom of said container and an outlet leading from the interior of said container, said outlet being located above said inlet, said infuser also including a filter means positioned between said inlet and said outlet for maintaining material being infused within the interior of said container in which the improvement comprises:
    said filter means being movable within the interior of said container relative to said inlet so as to be capable of holding different quantities of material to be infused in a packed condition within the interior of said container adjacent to the bottom of said container, and
    said outlet having an entrance, the position of said outlet being adjustable relative to the interior of said container so as to enable the position of said entrance to be varied to correspond to the position of said filter means within said container in order to prevent liquid from accumulating within said container above said filter means,
    positioning means for simultaneously adjusting the positions of said filter means and said outlet so as to hold said material and maintain said entrance of said outlet in a position corresponding to said position of said filter means.

2. An infuser as claimed in claim 1 including:
    vertically extending bearing means located in the bottom of said container and wherein
    said outlet comprises a hollow tube mounted in said bearing means so as to be capable of being moved in a vertically extending direction, the upper end of said tube serving as said entrance.

3. An infuser including a container having a top, a bottom, an inlet leading to the bottom of said container and an outlet leading from the interior of said container, said outlet being located above said inlet, said infuser also including a filter means positioned between said inlet and said outlet for maintaining material being infused within the interior of said container in which the improvement comprises:

said filter means being movable within the interior of said container relative to said inlet so as to be capable of holding different quantities of material to be infused in a packed condition within the interior of said container adjacent to the bottom of said container, and said outlet having an entrance, the position of which can be adjusted relative to the interior of said container so as to correspond to the position of said filter means within said container in order to prevent liquid from accumulating within said container above said filter means, vertically extending bearing means located in the bottom of said container and wherein said outlet comprises a hollow tube mounted in said bearing means so as to be capable of being moved in a vertically extending direction, the upper end of said tube serving as said entrance, said filter means has an opening formed therein, said opening being in communication with the upper end of said tube and including positioning means for adjusting the position of said filter means within said container, holding means for holding said filter means and said upper end of said tube together as said filter means is moved within said container so that liquid moving upward through said filter means in any position of said filter means will pass through said upper end of said tube.

4. An infuser as claimed in claim 3 wherein:
said holding means comprises spring means biasing said tube upwardly into contact with said filter means adjacent to said opening in said filter means.

5. An infuser as claimed in claim 4 including:
hollow bushing means secured to said filter means so as to extend through said opening in said filter means, said bushing means capable of fitting within and engaging said upper end of said tube.

6. An infuser as claimed in claim 5 including:
lid means for said container, and wherein
said positioning means comprises a threaded shaft attached to said filter so as to extend upwardly therefrom and rotatable nut means engaging said shaft for moving said shaft so as to adjust the position of said filter means within said container.

7. An infuser including a container having a top, a bottom, an inlet leading to the bottom of said container and an outlet leading from the interior of said container, said outlet being located above said inlet, said infuser also including a filter means positioned between said inlet and said outlet for maintaining material being infused within the interior of said container in which the improvement comprises:

said filter means being movable within the interior of said container relative to said inlet so as to be capable of holding different quantities of material to be infused in a packed condition within the interior of said container adjacent to the bottom of said container, and said outlet having an entrance, the position of which can be adjusted relative to the interior of said container so as to correspond to the position of said filter means within said container in order to prevent liquid from accumulating within said container above said filter means, said container has a cylindrical cup-like shape, and including check valve means in said inlet, a hollow tube slidably mounted in said bottom of said container, said tube serving as said outlet, the upper end of said tube serving as said entrance, spring means engaged between said container and said tube for biasing said tube upwardly within the interior of said container, a lid for said top of said container, mounting means for mounting said lid on said container, said mounting means connecting said lid and said container, rotatable nut means mounted on said lid so as to be accessible from the exterior of said lid, threaded shaft means engaged with said nut means and extending into the interior of said container, support means secured to said shaft within the interior of said container, said filter means being secured to said support means, said support means including a cylindrical periphery spaced from the interior of said container, seal means mounted on the periphery of said support means and engaging the interior of said container so as to form a seal therewith, bushing means mounted on said shaft and extending through the center of said filter means, said bushing means being capable of fitting within and engaging with the upper end of said tube and including openings leading into said bushing means from the side of said filter means closest adjacent to said lid.

8. An infuser including a container having a top, a bottom, an inlet leading to the bottom of said container and an outlet leading from the interior of said container, said outlet being located above said inlet, said infuser also including a filter means positioned between said inlet and said outlet for maintaining material being infused within the interior of said container in which the improvement comprises:

said filter means including an upper filter element and a lower filter element both upper and lower filter elements being positioned within the interior of said container, one of said upper and said lower filter elements being fixedly positioned within the interior of said container and the other of said upper and said lower filter elements being movably positioned within the interior of said container so as to be capable of holding different quantities of material to be infused in a packed condition between said upper and said lower filter elements;

said outlet having an entrance, said entrance being operatively associated with said upper filter element and capable of draining an infusion from the surface of said upper filter element after said infusion has passed upwardly through said upper filter element;

positioning means for adjusting the position of said movable element within the interior of said container so as to maintain said material in a packed position.

9. An infuser of claim 8 including:

a spring means for biasing said movable element toward said fixed element to maintain said material in said packed position.

10. The infuser of claim 9 wherein:

said outlet includes a hollow tube slidably mounted in said bottom of said container, the upper end of said tube serving as said entrance and each of said upper and said lower filter elements including an opening passing through said filter elements, said tube sealably passing through said opening in each of said upper and said lower filter elements.

* * * * *